Jan. 8, 1952     G. C. GOODELL, JR     2,581,792
EXPANSION AND SAFETY DEVICE FOR HYDRAULIC BRAKE SYSTEMS
Filed April 5, 1950
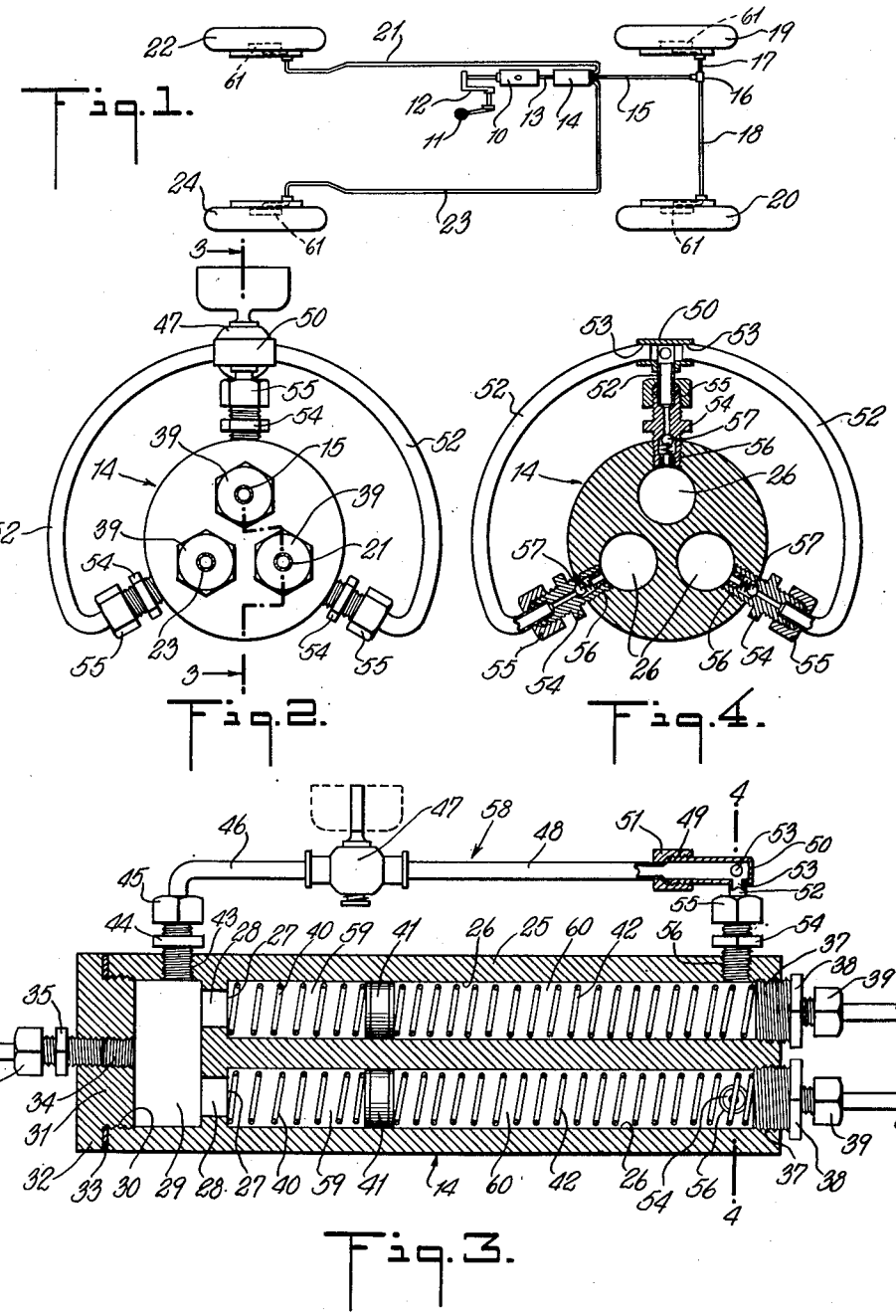
INVENTOR.
GUY CLIFFORD GOODELL, JR.
BY
Kenyon & Kenyon
HIS ATTORNEYS

Patented Jan. 8, 1952

2,581,792

UNITED STATES PATENT OFFICE 2,581,792

EXPANSION AND SAFETY DEVICE FOR HYDRAULIC BRAKE SYSTEMS

Guy Clifford Goodell, Jr., Worcester, Mass., assignor to Safety Hydraulics Company, a partnership, Framingham, Mass.

Application April 5, 1950, Serial No. 154,048

9 Claims. (Cl. 60—54.5)

This invention relates to the improvement of hydraulic brake systems and particularly to the improvement of hydraulic brake systems of the type used on motor vehicles.

Conventional motor vehicle hydraulic brake systems generally comprise a pedal operated master cylinder, having a reservoir of hydraulic fluid, and a plurality of wheel cylinders, the master cylinder being connected to each wheel cylinder by conduits. The entire system is normally filled with hydraulic fluid. When the motor vehicle operator presses down on the foot pedal, a piston in the master cylinder is operated, and forces fluid from the master cylinder through the conduits and into the wheel cylinders. The pistons of the wheel cylinders are thereby moved outwardly toward the brake drums and the brake shoes which are linked to the wheel cylinder pistons are moved into frictional engagement with the brake drums and thereby prevent or slow the rotation of the drums and the vehicle wheels attached to the drums. When foot pressure is removed from the foot pedal a spring returns the pedal to its elevated position, the pressure in the system drops off, springs attached to the brake shoes urge them away from the brake drums, the movement of the shoes returns the pistons in the wheel cylinders to their normal position, and the fluid is forced back into the master cylinder.

When one or more conduits break or leak, or one or more wheel cylinders break or leak, sufficient hydraulic fluid may be lost from the system so as to render the brake system inoperative. It is a characteristic of the conventional type of brake system that an important break or leak in any conduit or wheel cylinder renders the brakes on all the wheels inoperative.

In certain makes of cars, the emergency brake, which is normally connected to brake shoes through a mechanical linkage and does not operate through the hydraulic brake system, operates main brake shoes; that is, brake shoes that are also operated by the hydraulic brake system. A different emergency brake arrangement is to have the emergency brake and its mechanical linkage operate auxiliary brake shoes, which are separate from the main brake shoes operated by the hydraulic system. However, the arrangement of having the emergency brake operate main brake shoes exists in a large number of cars. In such a system, it sometimes happens that in adjusting the emergency brake mechanical linkage, the brake shoes are adjusted too close and frictionally engage the brake drums. When the motor vehicle is subsequently operated, these brake shoes drag, often imperceptibly to the operator of the motor vehicle. The brake lining is rapidly worn down, the brake drum is greatly heated by the friction and expands and the other parts of the brake system in the neighborhood of the drum are overheated. Due to the excessive heat or the increased movement of the wheel cylinder pistons required to apply the brakes, the hydraulic fluid may boil, the rubber seals on the pistons may be rendered porous, or the pistons in the wheel cylinder may be displaced. These events may cause the hydraulic fluid to leak out of the system, thus rendering the entire brake system of the car inoperative. This dangerous result can also be obtained, where the emergency brake operates main brake shoes, by driving the motor vehicle with the emergency brake left on accidentally.

It is an object of the invention to provide a safety device for use in hydraulic brake systems whereby broken or leaking portions of the conduits or wheel cylinders will be automatically sealed off from the operating remainder of the system; and to provide such a safety device whereby the thermal expansion or contraction of the hydraulic fluid in the conduits and wheel cylinders will not cause locked, dragging or inoperative brakes due to the effect of the expansion or contraction of the hydraulic fluid on the operation of the safety device itself.

Another object of the invention is to provide such a safety device that does not have to be disassembled or readjusted after a leaking or broken conduit or wheel cylinder has been repaired, and in which the operating parts automatically assume proper operating position after such repairs have been made and the hydraulic brake system completely refilled with fluid.

Another object is to provide such a device wherein the parts thereof are self-adjusting during operation and are not themselves capable of a non-temporary disarrangement due to the force of gravity or the acceleration or deceleration of the motor vehicle, which disarrangement might result in dragging or inoperative brakes.

A further object is to provide such a safety device whereby the passage of hydraulic fluid completely through the device, when it is in operative position to apply the brakes, is substantially non-occurring.

Still a further object is to provide such a safety device that can be rapidly and simply filled or refilled with hydraulic fluid after its installation or after a damaged part of the hydraulic brake system has been replaced.

Other objects and advantages of the invention will be apparent to one skilled in the art from the accompanying description of a preferred embodiment and from the drawing in which:

Fig. 1 is a view showing diagrammatically a three-line hydraulic brake system incorporating the present invention.

Fig. 2 is a front view of the safety device, also showing in cross-section the conduits leading from the front end thereof.

Fig. 3 is a sectional view taken along the broken line 3—3 of Fig. 2.

Fig. 4 is a sectional view taken along the line 4—4 of Fig. 3.

*General description*

Referring to the drawing, in Fig. 1 the three-line hydraulic brake system incorporating the safety device comprises a master cylinder 10, containing a reservoir of hydraulic fluid, the master cylinder being positioned adjacent the foot pedal 11. A piston (not shown) in the master cylinder is operatively connected by linkage 12 to foot pedal 11. The piston, when actuated by the depression of the foot pedal by the vehicle operator forces fluid out of the cylinder and into connection 13 and thereby into the safety device 14. The spring-urged return of the foot pedal, when released by the operator, operates to assist the return flow of the fluid back into the master cylinder. The connection 13 is an open conduit permitting the free flow of hydraulic fluid therethrough from the master cylinder to the safety device, and vice versa. The foot pedal 11, linkage 12, and master cylinder 10 are of the conventional type. The safety device incorporates three separate cylinders (as shown in Fig. 4) and conduit 15 connects one cylinder in the safety device through T connection 16 and conduits 17 and 18 to the wheel cylinders 61 of the conventional brake arrangement on each of the two front wheels 19 and 20. Conduit 21 connects a second cylinder in the safety device to the wheel cylinder 61 of the conventional brake arrangement on the left rear wheel 22. Conduit 23 connects a third cylinder in the safety device to the wheel cylinder 61 of the conventional brake arrangement on the right rear wheel 24.

Referring now to Figs. 2 and 3, the safety device generally indicated by the numeral 14 comprises a casing 25 having three cylindrical passages 26, hereinafter referred to as cylinders (all other types of cylinders in the system, such as master cylinders and wheel cylinders or brake cylinder motors, which latter expression is synonymous with "wheel cylinders," being so referred to, in order to differentiate from the cylinders of the device) which cylinders extend longitudinally from the right side of the casing (as viewed in Fig. 3) part way therein. At the left end 27 of each cylinder, as shown in Fig. 3, an orifice 28 is provided therein, which is smaller in diameter than the cylinder and connects that end of the cylinder to a common inlet chamber 29 formed in the left end of casing 25. The left end of casing 25 is interiorly threaded, as indicated at 30, and that end is closed by head 31 which has a portion for threaded extension into casing 25 and a surrounding flange 32, which compresses a gasket 33 against the adjacent end of the casing to form a leak-proof joint. The head 31 closes the chamber 29, and is provided with a threaded aperture or inlet passage 34 having fitting 35 screwed therein. Fixed to fitting 35 by a suitable coupling 36 is connection 13 which operatively connects chamber 29 to master cylinder 10. The right end of each of the cylinders 26 is interiorly threaded to provide an outlet passage 37, and has a fitting 38 screwed therein. The inside diameter of each fitting 38 is less than that of its cylinder and thus the inside end of the fitting provides a shoulder which determines the effective end of the cylinder 26. Fixed to each of fittings 38 by a suitable coupling 39 is one of the conduits 15, 21 or 23. Thus, each cylinder separately connects to a conduit or conduits which leads either to a rear wheel cylinder or to both front wheel cylinders.

Disposed within each cylinder 26 is a first spring 40, of short length, at the left end thereof, followed by a sealing piston 41, disposed for movement along the longitudinal axis of its cylinder, which piston is of one of the conventional types used in hydraulic brake systems. A conventional piston may consist of a rubber center section sandwiched and compressed between two metal end plates having a rivet or screw through their centers connecting them. Another type of conventional piston may consist of a rubber center section bonded to two metal end plates, the rubber section being of greater cross-sectional area than the end plates. A third type of conventional piston may consist of a metal center section having two rubber cups affixed to the center section, the lips of the cups being disposed away from the center section. Any of the above mentioned types of sealing pistons are operative to effectively prevent the passage of hydraulic fluid past the piston. At the right side of each cylinder 26 is a second spring 42, of longer length, when compared to spring 40, which second spring extends from the right-hand side of piston 41 to the inside end of the fitting 38 at the end of each cylinder. All of the springs 40 are of the same length and tension, and all of the springs 42 are of the same length and tension. Thus, a respective piston 41 is yieldably held within each cylinder in a predetermined balanced position by the combination of the balanced springs 40 and 42, the spring 40 abutting against the left end of the cylinder and pressing against the left side of the piston and the spring 42 pressing against the right side of the piston and abutting against the inside end of fitting 38 at the right end of the cylinder.

The piston 41 separates the cylinder 26 into two spaces, one on each side of the piston. The cylinder space containing the first spring 40, and the cylinder space containing the second spring 42 are hereinafter respectively referred to as the first spring cylinder space 59, or first chamber, and the second spring cylinder space 60, or second chamber. Near the left-hand end of casing 25, and at the top of chamber 29 a threaded aperture 43 is provided, fitting 44 is screwed therein and fixed to said fitting by a suitable coupling 45 is conduit 46, which connects to shut-off valve 47 by means of suitable fittings and couplings. Valve 47 connects to conduit 48 by means of suitable fittings and couplings. Conduit 48 is connected to the threaded end 49 of four-way connection 50 by means of a suitable coupling 51.

As shown in Figs. 3 and 4, a conduit 52 leads from each of the remaining three apertures 53 of connection 50 (by means of suitable fittings and couplings which are not shown) and is each connected to a fitting 54 by a suitable coupling 55. As can best be understood by a comparison of Figs. 3 and 4, at the right-hand end of each cylinder 26 a threaded passage 56 is provided through the casing and into the cylinder. Fitting 54 is screwed into passage 56. Each fitting 54 incorporates a ball check valve 57 which permits hydraulic fluid to flow into the cylinder, but not out of it. The above described structure extending between the chamber 29 and each of the cylinders 26, and encompassing the structural elements numbered 43 through 57 is hereinafter referred to as the by-pass line and is generally designated by the numeral 58.

Referring again to Fig. 3, the length and tension of the springs 40 and 42 is precisely determined and the effective length and volume of each cylinder 26 is made sufficiently large to avoid locked, dragging or inoperative brakes due to the effect of the expansion or contraction of the hydraulic fluid on the operation of the device itself.

Thus, in each cylinder, the length and volume of the cylinder and the length and tension of spring 40 in its extended position, when exerting force on the left side of piston 41 and opposed by an equal and opposite force exerted by spring 42, is such as to space the left side of the piston 41 from the left-hand end 27 of the cylinder by a distance which determines a volume in the cylinder (the first spring cylinder space) at least equal to the sum of the following volumes:

(1) The increase in volume of the hydraulic fluid contained in that portion of the braking system communicating with and including the second spring cylinder space, due to the thermal expansion of the hydraulic fluid within the design temperature range, which may be the range between the minimum design temperature and the maximum design temperature, or between a median design teperature and the maximum design temperature;

(2) The volume fixed in the cylinder by the fully compressed spring 40;

(3) The volume equal to a safety factor.

And under the conditions as above set forth, on the right-hand side of the piston the length and tension of the spring 42 in its extended position when exerting force on the right side of piston 41, and opposed by an equal and opposite force exerted by spring 40 is such as to space the right-hand side of piston 41 from the inside end of fitting 37 (the second spring cylinder space) by a distance which determines a volume in the cylinder, at least equal to the sum of the following volumes:

(1) The volume required to effectively apply the brakes connected to that cylinder;

(2) The decrease in volume of the hydraulic fluid contained in that portion of the braking system communicating with and including the second spring cylinder space, due to the thermal contraction of the hydraulic fluid within the design temperature range, which may be the range between the maximum design temperature and the minimum design temperature, or between a median design temperature and the minimum design temperature;

(3) The volume fixed in the cylinder by the fully compressed spring 42;

(4) The volume equal to a safety factor.

When the springs and cylinder are so constructed, the piston is yieldably held in its predetermined balanced position when the hydraulic system is under zero pressure.

To illustrate the volume to be provided for in dimensioning the cylinders, a specific example for a late model automobile is hereinafter set forth.

*Example*

In a 1950 Pontiac automobile, the safety device is connected immediately in front of the master cylinder, and that portion of the hydraulic brake system communicating with and including one second spring cylinder space and the two front wheel cylinders contains approximately 4.3 cubic inches of hydraulic fluid, plus the volume of the second spring cylinder space. That portion of the system communicating with and including another second spring cylinder space and the right rear wheel cylinder contains approximately 5.0 cubic inches of hydraulic fluid, plus the volume of the second spring cylinder space. That portion of the system communicating with and including a third second spring cylinder space and the left rear wheel cylinder contains approximately 4.0 cubic inches of hydraulic fluid, plus the volume of the second spring cylinder space.

The volume of fluid required to operate a single wheel cylinder to apply the brakes in any one wheel is approximately 0.6 cubic inch.

Let it be assumed that all first springs are identical, and all second springs are identical, and that the volume fixed in any second spring cylinder space by the fully compressed second spring is 0.7 cubic inch, and the volume fixed in any first spring cylinder space by the fully compressed first spring is 0.5 cubic inch.

The range of operating temperatures customarily provided for in the construction of motor vehicle brake equipment is from minus 40 degrees Fahrenheit to plus 160 degrees Fahrenheit. The composition of hydraulic fluids vary widely, although the base thereof is usually a vegetable oil, for example, castor oil. A conventional type of hydraulic fluid will expand approximately 17.5% within the above stated design temperature range. If it is determined that construction of the device is to provide for expansion and contraction from a median temperature, say 60° F., to the maximum design temperature of 160° F., or to the minimum design temperature of minus 40° F., then the volume of fluid will expand or contract approximately 8.75%, and the remainder of this example will be altered accordingly.

If it is desired to construct the safety device having standard size parts and cylinders, that is, all cylinders being of the same interior diameter and length, all second springs being identical, and all first springs being identical, then the volume in the first spring cylinder space and the second spring cylinder space of any cylinder must be separately determined for each cylinder and that portion of the hydraulic braking system with which it connects, and maximum first spring cylinder space and maximum second spring cylinder space do not necessarily both occur in the same cylinder.

In the present example, that second spring cylinder space having a maximum requirement is the second spring cylinder space feeding the two front wheel cylinders. The volume of fluid required to apply the brakes is 2×0.6 or 1.2 cubic inches. The volume fixed by the second spring is 0.7 cubic inch.

The volume of that portion of the hydraulic system communicating with and including one second spring cylinder space and the two front wheel cylinders is:

| | Cu. inches |
|---|---|
| Conduit and two front wheel cylinder volume | 4.3 |
| Volume fixed by second spring | 0.7 |
| Volume required to apply brakes in two wheels | 1.2 |
| Total | 6.2 |

The additional volume required in order to permit this volume of 6.2 cubic inches to contract without moving the piston too close to the right end of its cylinder, is 17.5% of 6.2 cubic inches. However, this additional volume must itself contract, and so on, in an infinite series, and therefore the limit of this function must be obtained. By simple algebraic calculation it will be found that the limit for 17.5% is 21.2+% or 21.3% approximately.

The volume is therefore 6.2×21.3%=1.32 cubic inches approximately.

The total volume is therefore 6.2+1.32 or 7.52 cubic inches, of which 4.3 cubic inches is outside of the second spring cylinder space and 3.22 cubic inches is the total volume of the maximum second spring cylinder space.

The first spring cylinder space having a maximum requirement is that one whose second spring cylinder space communicates with the right rear wheel cylinder.

Here the volume of this second spring cylinder space and the conduit and right wheel cylinder is as follows:

| | Cubic inches |
|---|---|
| Conduit and right wheel cylinder volume | 5.0 |
| Volume required to apply brake in one wheel | 0.6 |
| Volume fixed by second spring | 0.7 |
| Total | 6.3 |
| Volume required for contraction of this volume is (6.3×21.3%=1.32+ or) | 1.33 |
| Total | 7.63 |

The volume required in the first spring cylinder space is therefore the total of the volume fixed by the first spring plus the volume required to permit the volume entrapped in the second spring cylinder space and the conduit and right rear wheel cylinder to expand.

This volume is:

| | Cubic inches |
|---|---|
| Volume fixed by first spring | 0.5 |
| Expansion volume equals (7.63×17.5% or) | 1.34 |
| Total | 1.84 |

Thus, to provide a safety device for a 1950 Pontiac automobile, having cylinders of identical proportions, and using standard size pistons and springs, in each cylinder the volume in the first spring cylinder space is at least 1.84 cubic inches, and in each cylinder the volume in the second spring cylinder space is at least 3.22 cubic inches.

The total volume of each cylinder will be the total of the last two figures given above plus the volume of any safety factors with a correction made therein for expansion and contraction of such safety factor volumes, plus the volume occupied by the piston.

The springs 40 and 42 are of sufficient tension and length to overcome the friction between the piston and the cylinder walls and to reposition the piston at its predetermined balanced position in the cylinder after it has been moved therefrom by the application of pressure to the foot pedal, and the subsequent removal thereof whereby the hydraulic system is first placed under pressure and then returned to zero pressure. Spring 40, however, is not of a sufficient strength to effectively resist the movement of piston 41 caused by the expansion of the brake fluid and thus act to put on the brakes. Spring 42 is not of sufficient strength to effectively resist or hamper the movement of piston 41 when the brake pedal is operated to operate the brakes.

The springs 40 and 42 also operate to maintain each piston in proper position in its cylinder should the car be parked on an incline for any considerable length of time, and prevent unrestored movement when the motor vehicle accelerates or decelerates. If the springs were not present, then the piston, due to the unbalanced force of gravity or the acceleration or deceleration of the car, might move to one end or the other of the cylinder, especially if it were a poor fit in the cylinder. If the cylinder were not of sufficient length, then the piston, due to the expansion or contraction of the hydraulic fluid might move too close to one end or the other of the cylinder. If the piston did move toward the left end of the cylinder, then if the brake fluid should subsequently expand due to heat, the piston would bottom and the expanding brake fluid, having no other place to go, would operate to put on the brakes. If the piston did move toward the right end of the cylinder, then when the foot pedal of the brake system was operated there might not be sufficient travel remaining for the pistons to effectively apply the brakes.

*Operation*

The operation of the device is as follows:

The device is operative to permit the application of the brakes, when installed in the manner shown in Fig. 1, and when the shut-off valve 47 is in the closed, or solid line, position as shown in Fig. 3.

When the foot pedal 11 is applied, fluid is forced from master cylinder 10 through inlet passage 34 into chamber 29, and since valve 47 is closed the fluid passes through orifices 28 and moves each of the three pistons 41 toward the right end of its respective cylinder a sufficient amount to apply the brakes on each wheel or wheels to which that cylinder end is connected. When the pressure on the pedal 11 is released the fluid contained in the conduits and wheel cylinders is forced back by the spring device on the brake shoes, which is incorporated in all conventional wheel brake systems, the pressure in the hydraulic system returns to zero, and the pistons 41 are repositioned by the operation of their respective springs 40 and 42 for the next application of the brakes. Should any conduit or wheel cylinder break or leak, then when the brakes are next applied, the piston in the cylinder communicating with that conduit or wheel cylinder will move toward the right end of that cylinder. However, the second spring 42, in each cylinder, is of a sufficient number of turns and thickness of wire whereby when fully compressed, its length is sufficient to prevent its piston 41 from passing and closing passage 56 and rendering check valve 57 inoperative. The piston 41 bottoms against the compressed spring 42, which is retained in position by the inside end of fitting 38, and since no fluid can by-pass the piston that portion of the braking system communicating with that cylinder is effectively shut off. The hydraulic pressure is applied with equal force against the remaining operative pistons and thereby the remaining operative brakes are applied. When the pressure on the foot pedal 11 is released, all the pistons reposition themselves in their respective cylinders, and upon subsequent applications of the pedal the operative pistons continue to apply pressure to the operative portions of the brake system and the piston in the cylinder communicating with the broken conduit or wheel cylinder continues to bottom at the end of its right-hand travel in the cylinder and thus prevent loss of the brake fluid. Bleed-over from the operative second spring cylinder spaces to the second spring cylinder space leading to a broken conduit or wheel cylinder, through the three conduits 52 and the connection 50, is prevented by the operation of the check valves 57.

Repair of the system is accomplished as follows:

After replacing or repairing the defective conduit or wheel cylinder, valve 47 is placed in the open, or dotted line, position as shown in Fig. 3. The brake pedal is pumped up and down while the bleed point at the wheel cylinder on the wheel or wheels in which the brakes were inoperative is operated so as to permit the air to escape therefrom. Additional hydraulic fluid is added to the master cylinder to take the place of the lost fluid. As the foot pedal is pumped up and down, hydraulic fluid passes from the chamber 29 through the valve 47 and into the empty second spring cylinder space and thus into the repaired conduit and wheel cylinder. Bleed-back from the full hydraulic lines and second spring cylinder spaces 60 is prevented by the check valves 57. This prevents all the pistons from bottoming when the foot pedal is first operated and then reciprocating as pressure is released on the foot pedal, which would operate to suck air back into the full second spring cylinder spaces and conduits from the empty or partially empty one, some fluid being pumped out of the full second spring cylinder spaces into the empty one. If the check valves were not present, all wheel cylinders would have to be bled of air after a repair had been made in any one conduit. After the entire hydraulic brake system is again filled with fluid, the pistons automatically are repositioned in proper operating position by the springs since balanced pressure results on both sides of each piston 41 when valve 47 is open and the foot pedal is depressed. Valve 47 is then closed, and repair is completed.

When the device is first installed in a motor vehicle similar filling procedure is followed, except that in this case all wheel cylinders must be bled of air as the foot pedal is pressed up and down.

While the preferred embodiment described above and shown in the drawings is operative with a three-line brake system, the invention can be modified to accommodate a two-line brake system where one line serves both front wheels and the other serves both rear wheels merely by using a two-cylinder arrangement with the appropriate by-pass line thereto, rather than a three-cylinder arrangement. In like manner, the device is susceptible of modification to accommodate its use in a four-line system, where each line serves a separate wheel, by providing for four cylinders and the appropriate by-pass line thereto, instead of three cylinders.

While the preferred embodiment shows a device adaptable for installation in a motor vehicle having the conventional type of master cylinder, it is within the scope of the present invention that the connection between the master cylinder and the device may be disposed of and the device joined to the master cylinder as an integral part thereof.

It is further to be understood that a safety device comprising but a single cylinder, and its associated piston and springs, having only a by-pass line and shut-off valve, without a check valve therein, which by-pass line communicates between the first and second spaces of the cylinder, is operative to protect and seal off a connected single conduit or brake line that is damaged or leaking, or that is connected to one or two damaged or leaking wheel cylinders. In this modification, the remainder of the conduits or brake lines are connected to separate single cylinder safety devices, of the same type as described in this paragraph, and the operation of the single cylinder safety device leading to a broken or leaking conduit, wheel cylinder, or wheel cylinders prevents the hydraulic fluid of the entire braking system from draining out, whereby the brakes connecting through the undamaged remainder of the system are operative. By this, I contemplate a single master cylinder and a plurality of separate single cylinder safety devices communicating therewith, each single cylinder safety device communicating with a conduit or brake line leading to the wheel cylinder of a single wheel, or leading to the wheel cylinders of the two front wheels, or leading to the wheel cylinders of the two rear wheels.

The present invention is simple to install, effective in preventing inoperative brakes, is substantially foolproof, and permits of simple repair of a defective brake system in which it is installed without readjustment or disassembly of the device.

Having thus described the invention, what is claimed as new is:

1. An expansion and safety device for use with hydraulic braking systems comprising a plurality of cylinders each having an inlet end and an outlet end, an inlet chamber common to and communicating with the inlet end of each of said cylinders, a sealing piston in each cylinder disposed for movement along the longitudinal axis thereof while sealing the spaces within the cylinder on either side of the piston from one another, a first spring disposed in each cylinder between the sealing piston thereof and the inlet end thereof to urge said sealing piston resiliently away from said inlet end, a second spring disposed in each cylinder between the outlet end thereof and said sealing piston thereof to urge the latter resiliently away from said outlet end, a port opening into each cylinder adjacent said outlet end, a check valve for each port to allow fluid flow therethrough only into its respective cylinder, a by-pass line including a shut-off valve therefor connecting said common inlet chamber and each of said ports, an inlet passage communicating with said common inlet chamber, and an outlet passage for each cylinder communicating with said outlet end thereof.

2. An expansion and safety device for use with hydraulic braking systems, including brake cylinder motors and conduits leading thereto, said safety device comprising a plurality of cylinders, each having an inlet end and an outlet end, an inlet chamber common to and communicating with the inlet end of each of said cylinders, a sealing piston in each cylinder dividing it into a first chamber and a second chamber and disposed for movement along the longitudinal axis thereof while sealing the spaces within the cylinder on either side of the piston from one another, a first spring disposed in the first chamber in each cylinder between the sealing piston thereof and the inlet end thereof to urge said sealing piston resiliently away from said end, a second spring disposed in the second chamber in each cylinder between the outlet end thereof and said sealing piston thereof to urge the latter resiliently away from said outlet end, a port for each cylinder communicating therewith adjacent said outlet end thereof, a check valve for each said port to allow fluid flow therethrough only into the respective cylinder, a by-pass line including a shut-off valve therefor connecting said common inlet chamber and each of said ports, an inlet passage communicating with said common inlet chamber, and an outlet passage for each cylinder communicating with its second chamber, said first chamber having a capacity between the piston at the position of maximum first spring compression and the normal position of rest of the piston when the brakes are not applied at least equal to the normal thermal expansion of the fluid in the second chamber, the brake cylinder motor and the conduit connected to said second chamber whereby normal thermal expansion will not apply braking pressure to said brake cylinder motor.

3. An expansion and safety device for use with hydraulic braking systems, including brake cylinder motors and conduits leading thereto, said safety device comprising a plurality of cylinders, each having an inlet end and an outlet end, an inlet chamber common to and communicating with the inlet end of each of said cylinders, a sealing piston in each cylinder dividing it into a first chamber and a second chamber and disposed for movement along the longitudinal axis thereof while sealing the spaces within the cylinder on either side of the piston from one another, a first spring disposed in the first chamber in each cylinder between the sealing piston thereof and the inlet end thereof to urge said sealing piston resiliently away from said end, a second spring disposed in the second chamber in each cylinder between the outlet end thereof and said sealing piston thereof to urge the latter resiliently away from said outlet end, a port for each cylinder communicating therewith adjacent said outlet end thereof, a check valve for and controlling each of said ports to allow fluid flow therethrough only into the respective cylinder, a by-pass line including a shut-off valve therefor connecting said common inlet chamber and each of said ports, an inlet passage communicating with said inlet chamber and connecting the latter with the master cylinder of a motor vehicle, an outlet passage for each cylinder communicating with said outlet end thereof, the outlet passage of one of said plurality of cylinders being connected by conduits to the two front wheel brake cylinder motors of the vehicle in common, and the outlet passages of the remainder of said plurality of cylinders being each connected by conduits to respective rear wheel brake cylinder motors of the vehicle, whereby whenever a leak occurs in any one of the brake cylinder motors or conduits the brake cylinder motors of the other wheels connected to the others of said outlet passages remain operable without loss of hydraulic fluid therefrom and after repair of the leak the wheel brake cylinder motor and the cylinder connected therewith may be refilled with hydraulic fluid by opening said shut-off valve and operating said master cylinder while bleeding the brake cylinder motor.

4. An expansion and safety device for use with hydraulic braking systems including brake cylinder motors and conduits leading thereto, said safety device comprising a plurality of cylinders, each having an inlet end and an outlet end, an inlet chamber common to and communicating with the inlet end of each of said cylinders, a sealing piston in each cylinder dividing it into a first chamber and a second chamber and disposed for movement along the longitudinal axis thereof while sealing the spaces within the cylinder on either side of the piston from one another, a first spring disposed in the first chamber of each cylinder between the sealing piston thereof and the inlet end thereof communicating with said common inlet chamber to urge said sealing piston resiliently away from said end, a second spring disposed in the second chamber of each cylinder between the outlet end thereof and said sealing piston thereof to urge the latter resiliently away from said outlet end, a port for each cylinder communicating therewith adjacent said outlet end thereof, a check valve for and controlling each said port to allow fluid flow therethrough only into the respective cylinder, a by-pass line including a shut-off valve therefor connecting said common inlet chamber and each of said check valves, an inlet passage communicating with said common inlet chamber, and an outlet passage for each cylinder communicating with said outlet end thereof, said first chamber having a volume at least equal to the increase in volume, due to the thermal expansion within the design temperature range, of the hydraulic fluid contained in that portion of the braking system including the said second chamber, and its conduit and brake cylinder motor, plus the volume occupied by said first spring in a completely compressed state, and said second chamber having a volume at least equal to that of the decrease in volume, due to the thermal contraction within the design temperature range, of the hydraulic fluid contained in that portion of the braking system communicating with and including the said second chamber, its conduit and brake cylinder motor, plus a volume equal to that occupied by said second spring in a completely compressed state plus the volume of hydraulic fluid required to operate the brakes.

5. An expansion and safety device for use with hydraulic braking systems including brake cylinder motors and conduits leading thereto, said safety device comprising a plurality of cylinders, each having an inlet end and an outlet end, an inlet chamber common to and communicating with the inlet end of each of said cylinders, a sealing piston in each cylinder dividing it into a first chamber and a second chamber and disposed for movement along the longitudinal axis thereof while sealing the spaces within the cylinder on either side of the piston from one another, a first spring disposed in the first chamber in each cylinder between the sealing piston thereof and the inlet end thereof to urge said sealing piston resiliently away from said end, a second spring disposed in the second chamber in each cylinder between the outlet end thereof and said sealing piston thereof to urge the latter resiliently away from said outlet end, a port for each cylinder communicating therewith adjacent said outlet end thereof, a check valve for and controlling each said port to allow fluid flow therethrough only into the respective cylinder, a by-pass line including a shut-off valve therefor connecting said common inlet chamber and each of said check valves, an inlet passage communicating with said common inlet chamber, and an outlet passage for each cylinder communicating with said outlet end thereof and opening into the part of the second chamber occupied by the second spring when it is compressed.

6. An expansion and safety device for use with hydraulic braking systems including brake cylinder motors and conduits leading thereto, said safety device comprising a plurality of cylinders, each having an inlet end and an outlet end, an inlet chamber common to and communicating with the inlet end of each of said cylinders, a sealing piston in each cylinder dividing it into a first chamber and a second chamber and disposed for movement along the longitudinal axis thereof while sealing the spaces within the cylinder on either side of the piston from one another, a first spring disposed in the first chamber in each cylinder between the sealing piston thereof and the inlet end thereof to urge said sealing piston resiliently away from said end, a second spring disposed in the second chamber in each cylinder between the outlet end thereof and said sealing piston thereof to urge the latter resiliently away from said outlet end, said springs maintaining said piston in position to be moved by expansion of fluid in said cylinder or by the application of braking pressure, a port for each cylinder communicating therewith adjacent said outlet end thereof, a check valve for and controlling each said port to allow fluid flow therethrough only into the respective cylinder, a by-pass line including a shut-off valve therefor connecting said common inlet chamber and each of said check valves, an inlet passage communicating with said common inlet chamber, and an outlet passage for each cylinder communicating with said outlet end thereof.

7. For use with a motor vehicle hydraulic braking system having a master cylinder, a plurality of brake cylinder motors and conduits connecting thereto, an expansion and safety device comprising a plurality of cylinders each having an inlet end and an outlet end, an inlet chamber communicating with said master cylinder and with the inlet end of each of said cylinders, a sealing piston in each cylinder disposed for movement along the longitudinal axis thereof while sealing the spaces within the cylinder on either side of the piston from one another, a first spring disposed in each cylinder between the sealing piston thereof and the inlet end thereof to urge said sealing piston resiliently away from said end, a second spring disposed in each cylinder between the outlet end thereof and said sealing piston thereof to urge the latter resiliently away from said outlet end, a port for each cylinder communicating therewith adjacent said outlet end, a check valve for and controlling each said port to allow fluid flow therethrough only into the respective cylinder, a by-pass line including a shut-off valve therefor connecting said inlet chamber and each of said ports, and an outlet passage for each cylinder communicating with said outlet end thereof.

8. For use in an hydraulic braking system, adapted to be filled with fluid, comprising controllable means for establishing pressure within said fluid throughout said system and a plurality of brake means responsive to said pressure for applying a braking force, a safety device, adapted to be connected intermediate of said controllable means and said plurality of brake means to transmit said pressure therebetween, comprising means defining a plurality of enclosed spaces, a plurality of sealing means, one of said sealing means being disposed in each of said enclosed spaces, movable between opposite ends of its associated space, each said sealing means dividing its associated space into mutually sealed first and second spaces on the opposite sides of said sealing means, each said first space communicating with said controllable means and with the others of said first spaces, and each said second space communicating with at least one of said brake means, and resilient means disposed in each of said enclosed spaces, adapted to hold said sealing means thereof at a predetermined position between, but away from, said opposite ends of said enclosed space, when said pressure, established in said system by said first means, is relieved, each said first space having a capacity at least equal to the normal thermal expansion of the fluid in the associated second space and its associated brake means to permit normal thermal expansion and contraction of said fluid in said brake means communicating with each of said second spaces of said enclosed spaces, without causing said sealing means thereof to bottom during normal operation of said system.

9. A device as in claim 8 including by-pass means for interconnecting all of the intercommunicating said first spaces with each of the said second spaces, said by-pass means comprising first connecting means, a shut-off valve, and second connecting means, said first connecting means being between said intercommunicating first spaces and said manually operable shut-off valve, and said second connecting means being between said shut-off valve and each of said second spaces, said second connecting means comprising a separate conduit and check valve communicating with each of said second spaces permitting fluid to flow from said second connecting means into said second space but not from said second space into said second connecting means.

GUY CLIFFORD GOODELL, Jr.

REFERENCES CITED

The following references are of record in the file of this patent:

UNITED STATES PATENTS

| Number | Name | Date |
| --- | --- | --- |
| 1,578,824 | Herbst et al. | Mar. 30, 1926 |
| 2,055,182 | Schultz | Sept. 22, 1936 |
| 2,077,646 | Snyder | Apr. 20, 1937 |
| 2,239,348 | Wirtanen et al. | Apr. 22, 1941 |
| 2,249,227 | Press | July 15, 1941 |